Figure 2:
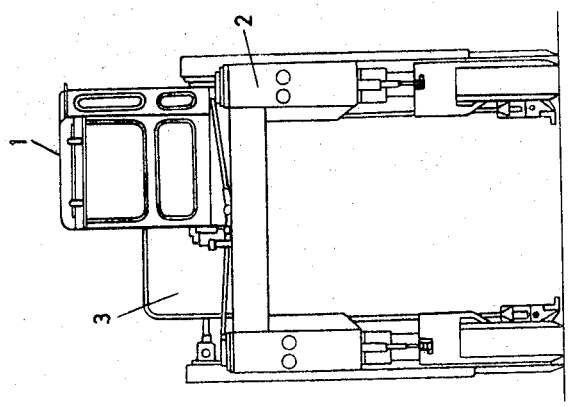

United States Patent
Falcone et al.

[11] 3,841,429
[45] Oct. 15, 1974

[54] DEVICE FOR A STRADDLE-CARRIER OR A SIMILAR VEHICLE

[75] Inventors: Francesco Falcone; Odd Peder Hunnes, both of Karlskoga, Sweden

[73] Assignee: Aktiebolaget Bofors, Bofors, Sweden

[22] Filed: Oct. 4, 1971

[21] Appl. No.: 186,111

[30] Foreign Application Priority Data
Oct. 13, 1970  Sweden.............................. 13818/70

[52] U.S. Cl............. 180/77 S, 180/89 R, 296/28 C, 296/65 R
[51] Int. Cl.............................................. B60p 1/02
[58] Field of Search................ 180/77 S, 89, 89 R; 297/344, 346, 349; 296/28 C, 37 R, 65 R; 214/392, 394

[56] References Cited
UNITED STATES PATENTS

| | | | |
|---|---|---|---|
| 1,306,498 | 6/1919 | Moses | 297/346 |
| 1,597,569 | 8/1926 | Barringer | 296/37 R |
| 1,672,212 | 6/1928 | Hale | 180/77 S |
| 2,422,813 | 6/1947 | Walch | 180/41 |
| 3,182,605 | 5/1965 | Brasher | 180/77 S |
| 3,278,222 | 10/1966 | Mullet et al. | 296/28 C |
| 3,643,994 | 2/1972 | Karlsson | 296/28 C |
| 3,655,081 | 4/1972 | Monk | 214/394 |
| 3,693,744 | 9/1972 | Horn et al. | 180/77 S |

FOREIGN PATENTS OR APPLICATIONS
208,878    6/1966    Sweden............................... 180/89

*Primary Examiner*—Kenneth H. Betts
*Attorney, Agent, or Firm*—Hane, Baxley & Spiecens

[57] ABSTRACT

There is disclosed a vehicle such as a straddle carrier with a driver's cab which is slidable into any one of a selected positions relative to the frame structure of the vehicle. The cab includes a seat which is rotatable so that the driver by sliding the cab itself and turning the seat can place himself in the position which is the most convenient to him for work to be performed.

3 Claims, 7 Drawing Figures

PATENTED OCT 15 1974

3,841,429

SHEET 1 OF 5

DEVICE FOR A STRADDLE-CARRIER OR A SIMILAR VEHICLE

The present invention relates to a straddle carrier or a similar vehicle, and especially to a new and improved design and equipment of the driver's cab of such a vehicle.

One of the major problems in connection with straddle carriers concerns the improvement of the view conditions for the driver. Straddle carriers have been involved in several serious crush accidents which have been caused almost totally by the fact that the driver has not been able to see well enough what has happened in the close vicinity of the wheels. In some places the authorities have raised increased demands for an improved safety in the handling of such large and cumbersome vehicles as straddle carriers. In order to improve the field of view for the driver several different designs have been proposed. Thus, the engine and gearbox of the straddle carrier have been disposed laterally of the driver's cab to obtain a better view forwards and rearwards. In addition, the vehicle can have a driver's cab in which are provided two separate sets of steering and control means to enable the driver to be facing the driving direction, even when driving rearwards. One such construction is described in Swedish Pat. 209,378 and in this case the driver's cab is disposed at the middle of the straddle carrier. However, such previous constructions have not proved to be satisfactory.

According to the present invention there has been provided a vehicle, especially a straddle carrier, comprising a driver's cab with a driver's seat, wherein the vehicle is operable from anyone of two driver's positions, one at each end of the vehicle, said driver's seat being rotatable and movable in the longitudinal direction of the vehicle between said positions.

In one embodiment of the invention the driver's cab is movable along the vehicle together with the driver's seat between said positions from which the vehicle can be operated.

The driver's seat can be rotatable in the driver's cab together with the control means required for operating the vehicle. There could also be provided two sets of control means in the driver's cab, said sets of controls being stationary in the cab and facing opposite directions, and the driver's seat being rotatable between said sets of controls. In another modification of the same embodiment the driver's seat and the control means are stationary in the driver's cab which is rotatable and movable relative to the vehicle.

Preferably, the driver's cab is movable by means of any suitable motor means.

According to another embodiment of the invention the driver's cab is mounted stationary on the vehicle and extends generally between the front and rear ends of the vehicle, the driver's seat being rotatable and movable within the driver's cab in the longitudinal direction of the vehicle. In this embodiment, the driver's seat is preferably movable on rails, tracks or the like disposed on the floor, ceiling or side walls of the driver's cab. Also preferably the driver's seat is movable by means of a hydraulic, pneumatic or electric motor.

Figure 1:
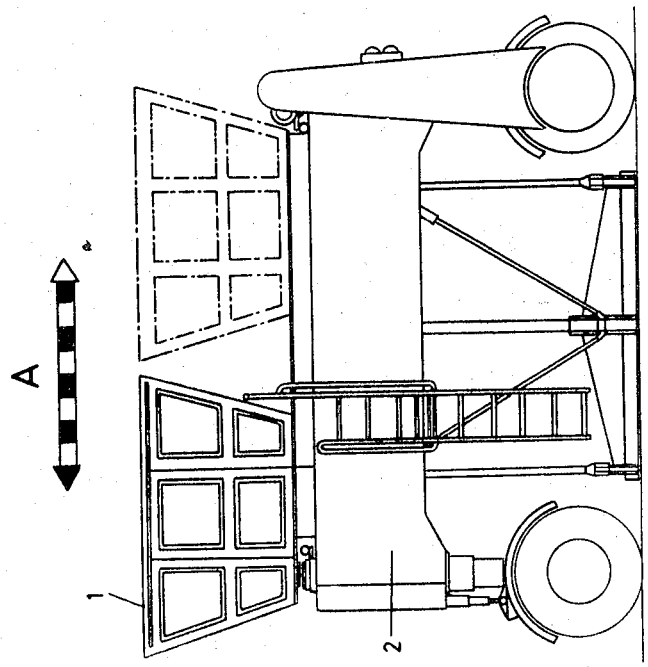
Figure 3:
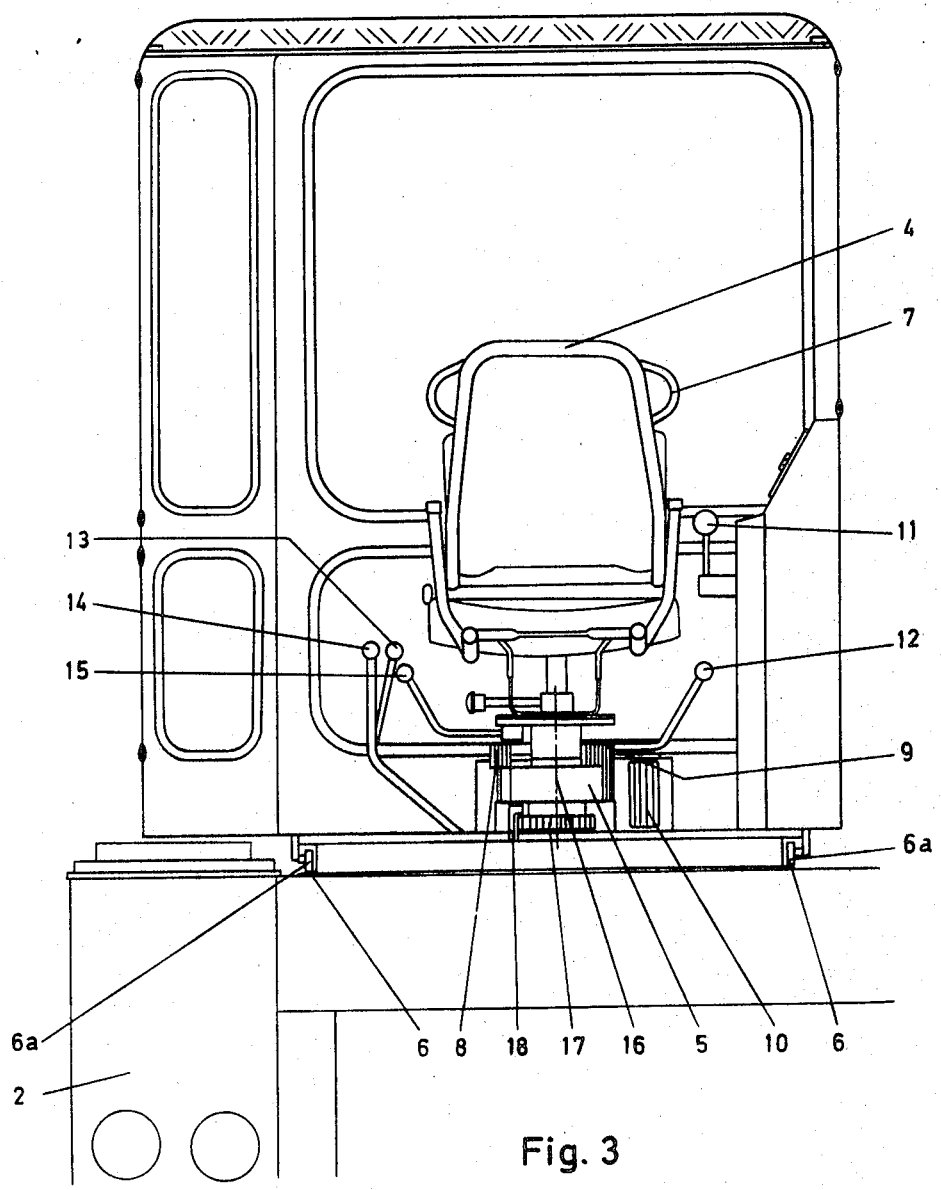
Figure 4:
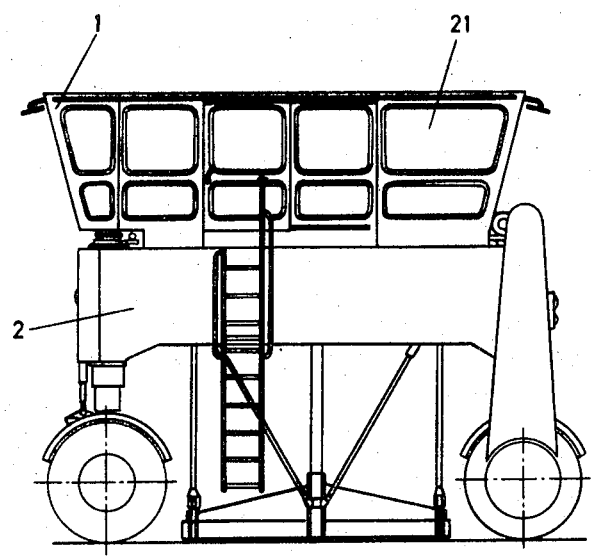
Figure 5:
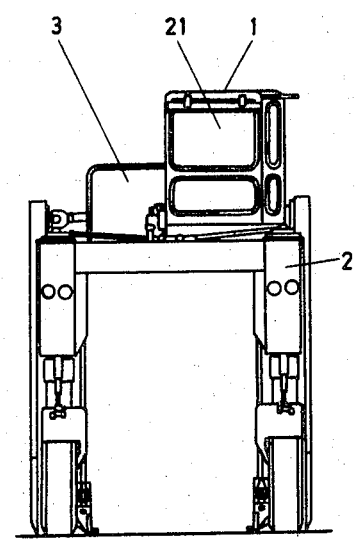
Figure 6:
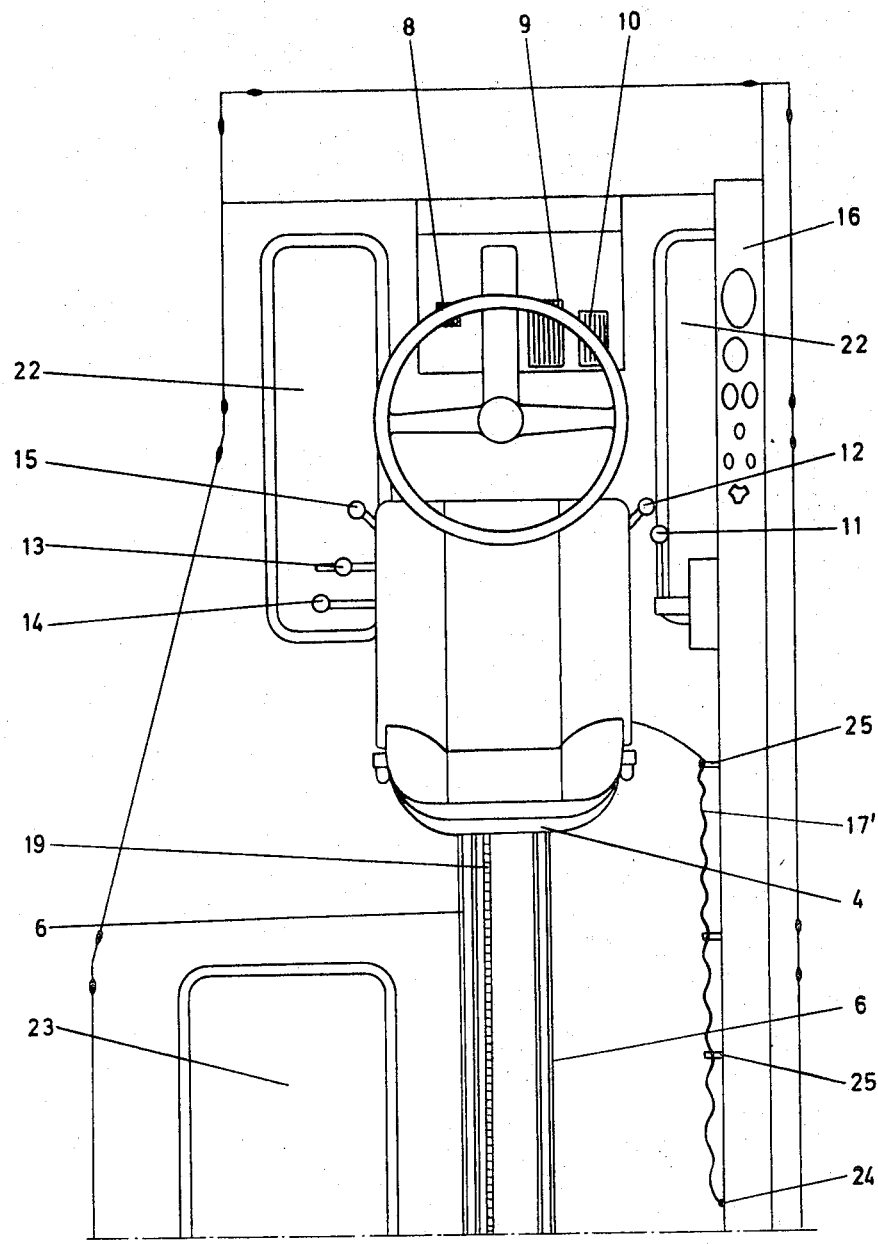
Figure 7:
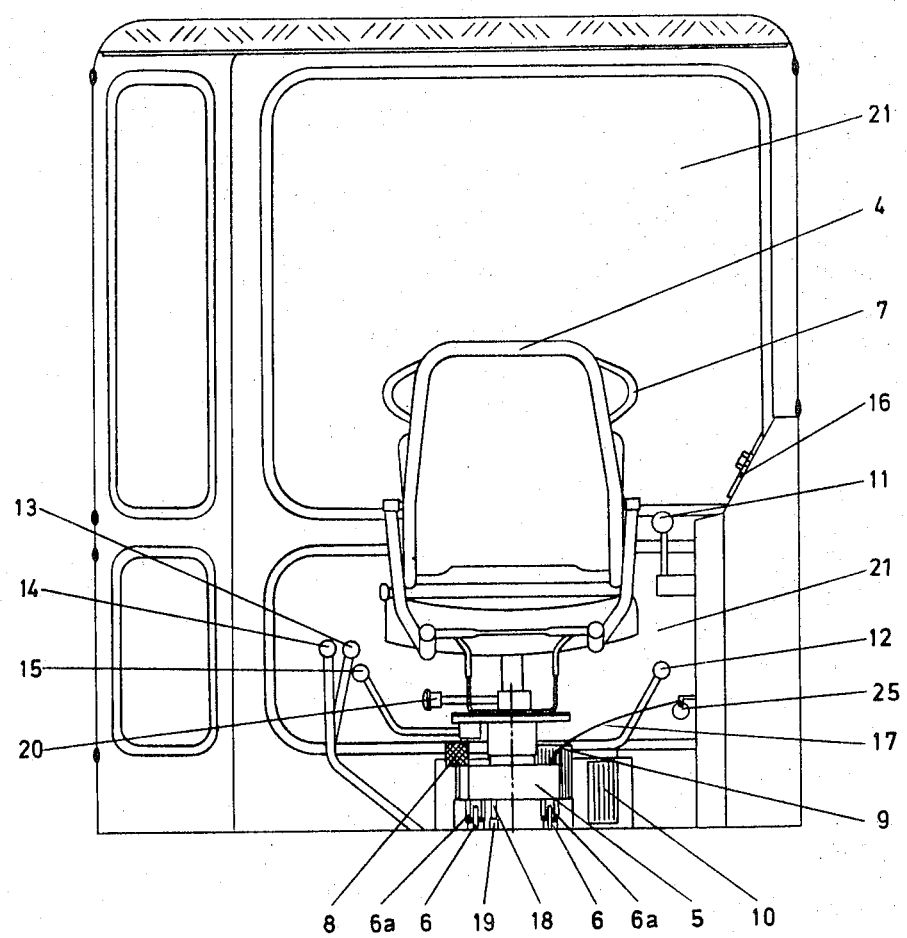

Given below is a detailed description of a straddle carrier according to the present invention, reference being made to the accompanying drawings, in which FIGS. 1 and 2 are side and front elevations, respectively, of a first embodiment of the straddle carrier according to the invention, FIG. 3 is a rear elevation of the driver's cab of the carrier shown in FIGS. 1 and 2, the rear wall of the driver's cab being omitted, FIGS. 4 and 5 are views corresponding to FIGS. 1 and 2, respectively, but of another embodiment of the invention, FIG. 6 is a diagrammatical top plan view of an end portion of the driver's cab of the carrier shown in FIGS. 4 and 5, and FIG. 7 is a cross elevational view of the driver's cab shown in FIG. 6.

Referring to the drawings, the straddle carrier shown in FIG. 1 comprises a movable driver's cab 1 which is in its front position on the frame 2 of the vehicle. The rear position of the driver's cab is shown by dash dotted lines. The driver's cab 1 is movable forth and back between said positions, as indicated by the two-way arrow A. FIG. 2 shows the position of the driver's cab with relation to the power device 3 of the carrier, said device comprising an engine and a gear-box.

FIG. 3 shows the driver's cab having a driver's seat 4, a steering wheel 7 and levers and pedals 8–14 required for the operation of the carrier. The driver's seat 4 is mounted rotatable together with the steering wheel 7 and the rest of the control means on a vertical pin 16. The driver's cab is movable on the vehicle frame 2 by means of supporting rolls 6a running on rails 6 attached to the frame 2 in the longitudinal direction thereof. The movement of the driver's cab along the rails is achieved by a reversible, electric motor 5 which is controlled by means of a lever 15. The motor actuates a gear 17 engaging a rack 18 which is attached to the vehicle frame parallel to the rails 6. By activating the motor 5, the driver's cab can thus be moved along the rails 6.

The various controls of the driver's cab are preferably connected to the engine, gear-box, etc., of the carrier by means of flexible connecting means (not shown), such as electric cables, hoses or the like. In addition to the extreme positions shown in FIG. 1, the operator can therefore set the driver's cab in any desired position along the length of the vehicle and also operate the vehicle from such position. Further, owing to the fact that the driver's seat is rotatable together with the controls, the driver can always be facing the desired direction. By lever 12 the driver's seat can be released and locked in any direction desired.

In the embodiment of the invention shown in FIGS. 4 – 7 the straddle carrier is provided with a driver's cab 1 which extends to the front and rear ends of the vehicle frame 2. The driver's cab comprises windows 21.

In FIGS. 6 and 7 there is shown the interior of the driver's cab in which is provided a driver's seat 4 and controls. The driver's seat is movable forwards and rearwards along rails 6 by means of an electric motor 5 disposed under the seat 4 and rigidly attached thereto. The steering wheel 7 is connected to a steering device (not shown) which provides for equal steering deflection irrespective of the position of the seat 4. The control means comprise a clutch pedal 8, a brake pedal 9 and a throttle pedal 10, and to the right of the driver's seat there is a shift control lever 11 for driving forwards and rearwards, and an instrument panel 16. On the right hand side of the driver's seat there is a lever 12 for releasing and locking the seat 4 to control the rotation thereof.

To the left of the seat 4 are provided levers 13 and 14 for controlling the grasping and lifting of a load. A lever 15 is provided for actuating the electric motor 5 to move the seat in any desired direction. The motor 5 is connected to a socket 24 by an electric cable 17' supported by slidable rings 25. The electric motor actuates a pinion 18 which cooperates with a stationary rack 19 on the floor. Owing to the fact that the motor is attached to the seat 4, the seat will roll on supporting wheels 6a along the rack 19, when the motor 5 is actuated. In addition, the driver's seat is provided with a damping device 20 adapted to protect the driver from heavy shocks occurring during operation of the straddle carrier.

On the floor of the driver's cab at each end thereof windows or hatches 22 which can be opened are provided to facilitate the inspection of the load. Additional windows or hatches 23 are provided at the middle of the floor. In case of such design according to the invention in which the driver's seat, the steering means and controls are arranged to form a single unit which can be moved and rotated, a further driver's position (not shown) can be arranged at these windows 23 to enable the driver to make directional corrections when loading or unloading, even when the driver is directly above the load between the ordinary driver's positions which are at both ends of the driver's cab.

The above description is made of illustrating purposes only and the invention is, of course, not delimited to the embodiments described therein, but various additional modifications can be made, within the scope of the appended claims.

We claim:

1. A straddle carrier comprising:
   a vehicle having an elongate peripheral outline in the moving direction of the vehicle;
   a driver's cab stationarily mounted on the top of said vehicle lengthwise thereof, said cab occupying substantially the length of the vehicle top and having observation windows in its sides;
   guide tracks within the cab extending lengthwise of the cab and the vehicle;
   a swivelling driver's seat supported on said guide tracks movable along the length thereof in either direction;
   a motor drive mounted on said driver's seat and coupled with the same for driving the seat along the guide tracks in either direction; and
   circuit control means for controlling the driving of the seat along the guide tracks and operation of the carrier.

2. The straddle carrier according to claim 1 wherein said guide tracks are on the floor of the cab.

3. The straddle carrier according to claim 1 wherein the cab has a floor including at least one observation opening.

* * * * *